United States Patent
Levin et al.

(10) Patent No.: US 7,027,279 B2
(45) Date of Patent: Apr. 11, 2006

(54) COMBINED HARMONIC FILTER AND PHASE CONVERTER OR PHASE SHIFTING DEVICE

(75) Inventors: Michael I. Levin, North York (CA); Anthony H. Hoevenaars, Aurora (CA); Igor V. Volkov, Kiev (UA)

(73) Assignee: 1061933 Ontario Inc., Mississauga (CA)

( * ) Notice: Subject to any disclaimer, the term of this patent is extended or adjusted under 35 U.S.C. 154(b) by 538 days.

(21) Appl. No.: 10/396,718

(22) Filed: Mar. 26, 2003

(65) Prior Publication Data

US 2004/0183377 A1    Sep. 23, 2004

(30) Foreign Application Priority Data

Mar. 17, 2003   (CA) .................................... 2422529

(51) Int. Cl.
*H02H 3/00* (2006.01)
(52) U.S. Cl. ........................ 361/58; 361/113
(58) Field of Classification Search ................. 361/58, 361/113
See application file for complete search history.

(56) References Cited

U.S. PATENT DOCUMENTS

| | | | | |
|---|---|---|---|---|
| 5,434,455 A | * | 7/1995 | Kammeter | 307/105 |
| 6,101,113 A | * | 8/2000 | Paice | 363/126 |
| 6,930,578 B1 | * | 8/2005 | Thibault et al. | 336/5 |

* cited by examiner

*Primary Examiner*—Stephen W. Jackson
(74) *Attorney, Agent, or Firm*—Dimock Stratton LLP; Mark B. Eisen

(57) ABSTRACT

A harmonic mitigating device also functions as a phase converter for supplying single-phase non-linear loads, or as a phase shifting device for three-phase non-linear loads with multiple inputs to create a quasi multi-pulse system. A multiple-winding reactor or a plurality of single-winding reactors, and at least one capacitor, are connected in a crosslink circuit between the reactor windings, or between the reactor windings and another line. At least one reactive element comprising a line winding is connected to each phase or to the neutral and in series with a non-linear load, which provides a high reactance to harmonic currents, and at least one crosslink circuit comprising a second reactive element connected between the second end of the line winding and a capacitor which is connected to any other line in the system.

25 Claims, 13 Drawing Sheets

1- Phase A Applied Voltage
2- Bridge 1 Input Voltage
3- Bridge 2 Input Voltage

Non-Linear Load

Non-Linear Load

COMBINED HARMONIC FILTER AND PHASE CONVERTER OR PHASE SHIFTING DEVICE

FIELD OF THE INVENTION

This invention relates to harmonic mitigating devices. In particular, this invention relates to a harmonic filter and phase converter or phase shifting device for single- and three-phase electrical power distribution systems.

BACKGROUND OF THE INVENTION

In urban areas in North America a typical electrical distribution system provides three phases. When non-linear and other harmonic generating loads are connected to a three-phase system, harmonic currents are fed back into the power supply and can cause many problems, such as reducing the electromagnetic compatibility of the loads and overheating of transformers.

In a three-phase power distribution system, the phases can be phase shifted relative to one another, to suppress or completely cancel many of the more harmful harmonic currents. However, in rural locations, and other remote locations such as oil fields, often the electrical distribution system provides only a single phase. In these cases the power supply can still be connected to non-linear three-phase harmonic generating loads, for example variable speed drives and the like. Such loads, when fed by a single-phase power supply, become single-phase loads and generate substantially higher harmonic levels than when fed by a three-phase system.

Typical harmonics generated by a single phase harmonic generating load are the 3rd, 5th, 7th, 9th, 11th, etc. In addition to higher harmonic levels, when connected to a single-phase power supply such loads consume substantially higher current and have a substantially higher level of DC bus voltage ripple. This results in increased losses in the system and requires that the harmonic generating drive be de-rated, i.e. larger than the optimum rated drive, so as to consume less current and reduce DC bus voltage ripple.

For example, FIG. 1 illustrates a typical current consumption waveform of a single-phase adjustable speed drive, showing the current spectrum and a table of typical harmonic levels. Those skilled in the art will appreciate that the level of harmonic currents generated by such a variable speed drive fed by a single-phase power supply is approximately twice as high as the level generated by a three-phase variable speed drive connected to a three-phase power supply.

Prior art systems for mitigating harmonic currents fall into six basic types:

1. Power factor corrected (PFC) power supplies: In these systems the rectified current is continually adjusted to smooth the current consumption waveform. An example is illustrated in FIG. 3. PFC's are relatively expensive devices and their applications are limited. Also, PFC's cannot be retrofitted for use with existing power supplies, and are not practical for use with large ASD's.

2. Active filters: These devices inject into the conductors between the power distribution system and the load, harmonic currents having a polarity opposite to those generated by the load, thereby neutralizing harmonic currents flowing into the power distribution system. An example is illustrated in FIG. 4. Active filters have many disadvantages, including high cost, poor reliability and poor dynamic characteristics. Active filters also are not practical for use with large ASD's.

3. Resonant L-C filters: L-C filters are commonly used in power systems, tuned to different harmonic frequencies to mitigate specific harmonic currents. An example is illustrated in FIG. 5. These devices present many problems which are well known to those skilled in the art, including high cost, poor effectiveness in low voltage systems and the tendency to cause the system to operate with a leading power factor. Further, because L-C filters are non-directional they are easily overloaded by untreated harmonic currents generated by other harmonic sources connected to the power distribution system (for example in a neighbouring facility), resulting in overloading and frequent failures of the filter's capacitor bank.

4. AC chokes: In this harmonic mitigating technique reactors are connected in series between the line and the load. An example is illustrated in FIG. 6a (without a core) and 6b (with a core). This technique is simple, reliable and relatively low cost, however it results in a high voltage drop across the reactors. To reduce the voltage drop one must reduce the choke reactance level, which commensurately reduces the effectiveness of the choke and substantially limits harmonic current mitigation.

5. Phase shifting systems: Different kinds of phase shifters are available which allow the creation of quasi-multiphase systems, reducing certain harmonic levels. Harmonic currents of targeted orders are cancelled or substantially reduced depending upon the selected degree of the phase shift. However, such systems are typically limited in terms of the number of harmonic orders which can be mitigated, and the degree of harmonic mitigation depends upon the extent to which harmonics produced by the various harmonic sources and their phase shift angles are identical.

6. A harmonic mitigating system with a multiple winding reactor and capacitors, having a crosslink circuit providing an inductance to attract harmonic currents, as described in U.S. Pat. No. 6,127,743 issued Oct. 3, 2000 to Levin, which is incorporated herein by reference. Such a harmonic mitigating system presents a high impedance for harmonic currents flowing toward the power supply, but a low impedance for targeted harmonic currents flowing through the crosslink. Thus, the majority of harmonic currents are diverted through the crosslink and isolated from the power supply. This system addresses a large number of harmonic mitigating problems, but also provides certain drawbacks as a result of high internal impedance of the harmonic mitigating device.

The prior art for two-phase to three-phase converters falls into two basic types:

1. Mechanical converters such as rotating or dynamo-electric machines (motor-generators) in which a single-phase motor drives a three-phase generator. This conversion method is expensive and provides low reliability and high losses. Moreover, such devices introduce substantial impedance into the circuit supplying the non-linear load. The result is a high level of voltage distortion and reduced electromagnetic compatibility of the loads.

2. Various types of inductor-capacitor (L-C) networks. Examples of prior art configurations of two-element L-C networks for converting single-phase to three-phase are shown in FIGS. 7A to 7K. Examples of configurations of three-element prior art L-C networks for converting single-phase to three-phase are shown in FIGS. 7L to 7P. Examples of configurations of single-element prior art L-C networks for converting single-phase to three-phase are shown in FIGS. 7Q to 7T.

None of these prior art phase converters has any significant effect on harmonic currents generated by non-linear loads, and in fact in many cases the phase converter increases voltage distortion, thus making the situation worse. High levels of harmonic currents create many problems in power supply and distribution systems, including increased total harmonic distortion level of the voltage, reduced electromagnetic compatibility of the loads, reduced liability of the equipment resulting in higher maintenance costs and increased down time of the system, increased power losses, reduced power factor and other problems that are well known to those skilled in the art.

The prior art does not provide a system which combines harmonic mitigation and phase conversion. Thus, in order to avoid both of these problems, prior art systems supplying power to non-linear loads require a harmonic mitigating device and a separate two-phase to three-phase converter (in the case of a single-phase power supply) or phase shifting device (in the case of a three-phase power supply).

To mitigate harmonic currents generated by harmonic generating loads in a three-phase system, frequently a 12-pulse rectification system is used. In such a system the rectifier input comprises two three-phase rectifier bridges connected to the power supply by a phase shifting device that provides a 30° phase shift between the voltages supplied to the bridges. As well known to those skilled in the art, this cancels harmonics of the 5th, 7th, 17th and 19th orders. A reduction of other levels of harmonic currents using the same phase shifting principles requires an 18-pulse or 24-pulse rectification system, with associated additional cost and space requirements.

Furthermore, this solution is not available in a single-phase system. An alternative option currently being used for feeding single-phase non-linear loads, as noted above, is to use a harmonic mitigating device and de-rate the three-phase equipment. For example, for a typical adjustable speed drive (ASD) a de-rating of 50% is typically used. This de-rating substantially increases the cost of the system, and requires the use of additional harmonic mitigating equipment that further increases the cost and space requirements of the power system.

It would accordingly be advantageous to provide a system which combines harmonic mitigation and phase conversion.

SUMMARY OF THE INVENTION

The present invention overcomes these disadvantages by providing a harmonic mitigating device that also functions either as a single-phase to three-phase converter for supplying single-phase non-linear loads or, using the same principles of the invention, as a phase shifting device for three-phase non-linear loads with multiple inputs to create a quasi multi-pulse system. In both cases the device is connected between the power supply and the load, and substantially reduces the levels of selected harmonic currents flowing into the power supply system.

The invention accomplishes this by providing a multiple-winding reactor or a plurality of single-winding reactors, and at least one capacitor, connected in a crosslink circuit between the reactor windings, or between the reactor windings and at least one other phase or a neutral conductor.

According to the invention, at least one reactive element comprising a line winding is connected to each phase or to the neutral. The line winding is connected in series with a non-linear load and provides a high reactance to harmonic currents generated by the load and flowing toward the power distribution system. The device of the invention further provides at least one crosslink circuit comprising a second reactive element comprising a crosslink winding, connected between the second end of the line winding and a crosslink capacitor or a capacitor bank. The crosslink capacitor bank is connected between the second end of the crosslink winding and any other line in the system, for example the crosslink circuit of another phase of the power distribution system, or a neutral of the capacitor bank (which may or may not be connected to the system neutral). In some cases it is also possible to connect the other side of the capacitor directly to another phase.

The parameters of the crosslink winding and capacitor are selected such that the crosslink circuit provides a low reactance to selected harmonic currents generated by the load, and at the same time optimizes the voltage level and desired phase angle of a phase shifted output (or set of outputs), which is disposed between the crosslink winding and the capacitor. The main output (or in a three-phase device, the set of main outputs) is provided by the second end of the line winding and is substantially in phase with the primary. Thus, the phase shifted output is phase shifted relative to the main output, by any desired angle. In general a phase shift of approximately 30° is desirable, to eliminate harmonic currents which are present at the highest levels as shown in FIG. 1; however, any desired phase angle may be created according to the principles of the invention.

The line and crosslink windings are preferably wound on a common core, which reduces the cost of the device. However, the line and crosslink windings may alternatively be wound on different cores which may or may not be magnetically coupled.

Optimization of the output voltages can be achieved by adding one or more voltage drop compensating windings to the main out put of the reactor. The voltage drop compensating winding may be wound on the same core leg as the line or crosslink windings, or on a different core leg. The voltage drop compensating winding is connected in a polarity in which the magnetic flux that it generates is opposite in direction to the magnetic flux generated by the line or crosslink windings (or both), which reduces the through-impedance of the device. Alternatively, an auxiliary winding may be connected in the same polarity as the line winding, in which case the winding will not compensate for voltage drop but may provide more flexible frequency tuning.

In further aspects of the invention the magnetic core may be provided with at least one non-magnetic gap. Various additional line windings, auxiliary windings and/or crosslink elements (windings and capacitors) may be provided as desired to improve the targeting of specific harmonic frequencies and/or phase-shift angles, all according to the principles of the invention.

In the application of the invention to a single-phase power supply system, the device of the invention provides an additional output in the crosslink circuit having a voltage phase-shifted in a way that produces a system which approximates a three-phase power supply system.

The present invention thus provides a combined phase converter and harmonic mitigating device for connection between a power distribution system and a multi-phase load, comprising at least one line winding, having a first end connected to a first line comprising a first phase of the power distribution system and a second end connected directly or indirectly to a first input of the load, a crosslink circuit comprising at least one crosslink winding, having a first end connected to the second end of the line winding and a second end connected through a capacitor to a second line, and a phase shifted output between the second end of the crosslink winding and a second input of the load, whereby the voltage through the phase shifted output is phase shifted relative to the voltage through the first line.

The present invention further provides a harmonic mitigating device for connection between a three-phase power distribution system and a three-phase load, comprising, for each phase, at least one line winding, having a first end connected to a first line comprising a phase of the power distribution system and a second end connected directly or indirectly to a first input of the load, a crosslink circuit comprising at least one crosslink winding, having a first end connected to the second end of the line winding and a second end connected through a capacitor to a second line, and a phase shifted output between the second end of the crosslink winding and a second input of the load, whereby the voltage through the phase shifted output is phase shifted relative to the voltage through the first line.

The present invention further provides a method of phase conversion and harmonic mitigation in a power distribution system supplying electrical power to a multi-phase load, comprising the steps of: a. supplying power from a first line comprising a first phase of the power distribution system to a first phase of the load, through at least one line winding, b. diverting power, through a crosslink circuit comprising at least one crosslink winding having a first end connected to a load end of the line winding and a second end connected through a capacitor, to a second line, and c. supplying power from the crosslink circuit to a second input of the load through a phase shifted output between the second end of the crosslink winding and the second phase of the load, to thereby phase shift the second phase of the load relative to the first phase of the load.

BRIEF DESCRIPTION OF THE DRAWINGS

In drawings which illustrate by way of example only preferred embodiments of the invention.

DETAILED DESCRIPTION OF THE INVENTION

Figure 6:
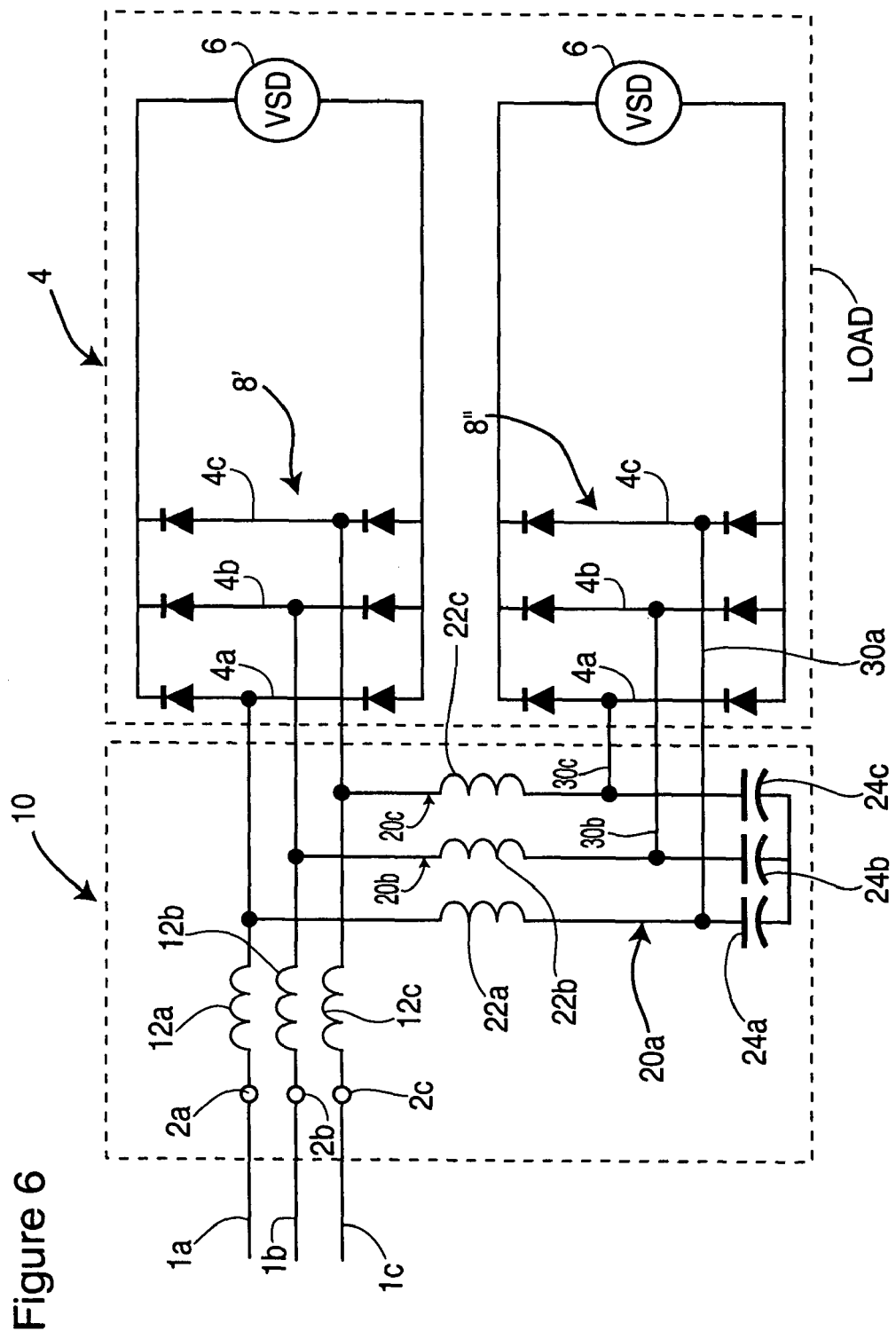
FIG. 6 is a schematic illustration of a three-phase power distribution system utilizing a three-phase embodiment of the invention for creation of a 12-pulse system.

A preferred embodiment of the invention for use in a three-phase power distribution system is illustrated in FIG. 6. Terminals 2a, 2b, 2c connect the device 10 to the lines 1a, 1b, 1c transmitting the three phases of the power supply. The power distribution system (not shown) may be any three-phase alternating current system, and the load 4 may comprise one or more harmonic generating loads, for example a variable speed drive (VSD) 6 with a bridge rectifier 8 for converting the alternating current to a direct current for driving the VSD 6. The rectifier bridges may be connected in parallel or in series. The DC output of each bridge may be provided with reactors to equalize the current distribution between the bridges, as is conventional.

Each line winding 12a, 12b, 12c comprises a first end connected to a first line, i.e. one phase of the power distribution system, and a second end connected to one phase 4a, 4b or 4c of the load 4. Each line winding 12a, 12b, 12c comprises a reactive element, such as a coil or winding, having a selected reactance. Each line winding 12a, 12b, 12c thus interposes an impedance between the respective line 1a, 1b, 1c and the corresponding phase 4a, 4b, 4c of the load 4.

The crosslink circuits 20a, 20b, 20c each respectively comprise at least one crosslink winding 22a, 22b, 22c, having a first end connected to the second end of the corresponding line winding 12a, 12b and 12c, and a second end connected through a capacitor 24a, 24b or 24c to a second line. For example, the second end of the crosslink circuit 20a, 20b or 20c may be connected to the crosslink circuit 20a, 20b or 20c of one or more other phases, to a neutral (not shown), or directly to another phase. The crosslink circuits 20a, 20b, 20c thus provide a low impedance pathway from each phase to the respective capacitor 24a, 24b or 24c. Phase shifted outputs 30a, 30b, 30c corresponding to each phase 1a, 1b, 1c are respectively provided between the second end of the crosslink winding 22a, 22b, 22c and the capacitors 24a, 24b or 24c.

Thus, the second end of each line winding 12a, 12b, 12c associated with each phase 1a, 1b, 1c is connected to a corresponding phase 4a, 4b or 4c of one bridge rectifier 8' of the pair of bridge rectifiers in the load 4, the phase shifted output 30a, 30b, 30c corresponding to each phase 1a, 1b, 1c is respectively connected between the second end of the crosslink winding 22a, 22b, 22c and a phase 4a, 4b or 4c of the second bridge rectifier 8'' of the pair of bridge rectifiers in the load 4. For example, in the embodiment shown the line winding 12a delivers power from the first line 1a of the three-phase power distribution system directly to the phase 4a of the first bridge rectifier 8', through the crosslink winding 22a and through the first phase shifted output 30a to an input of the second bridge rectifier 8'' (in the embodiment shown, the input corresponding to phase 4c).

In operation, an alternating current is supplied through the lines 1a, 1b, 1c to terminals 2a, 2b, 2c of the device 10. The resultant voltage across line windings 12a, 12b and 12c is transmitted to the corresponding phases 4a, 4b, 4c of the first rectifier bridge 8'. Since the components of the crosslink circuits 20a, 20b, 20c have been selected to provide a lower impedance ice at selected harmonic frequencies than the impedance of the line windings 12a, 12b, 12c at the same harmonic frequencies, the targeted harmonic currents are diverted through the crosslink circuits 20a, 20b, 20c and are substantially prevented from entering the lines 1a, 1b and 1c of the power distribution system.

Figure 1A:
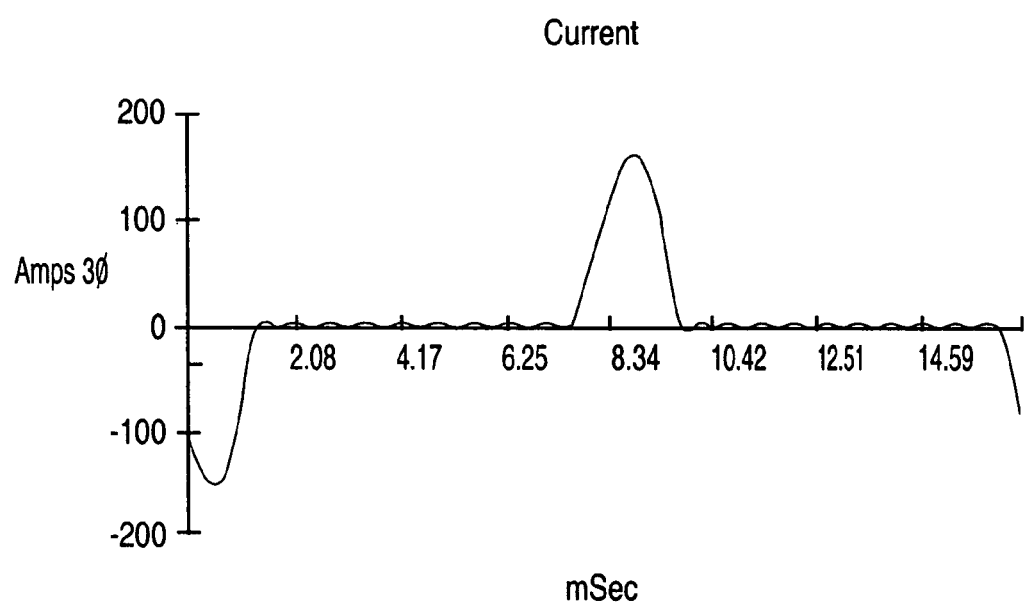
FIGS. 1A and 1B are graphs showing respectively a typical current consumption waveform of a single-phase rectifier load and its corresponding typical harmonic distribution.
Figure 1B:
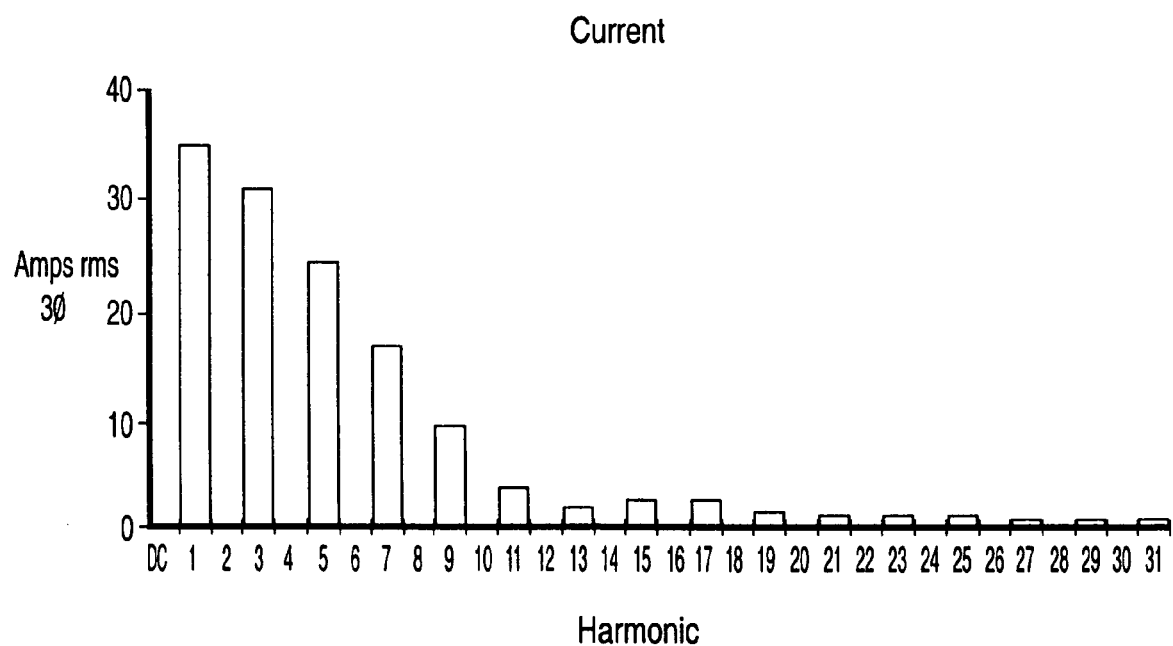
Figure 2A:
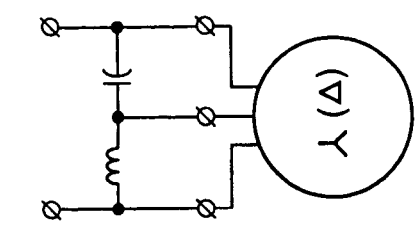
FIGS. 2A to 2Q are schematic illustrations showing various configurations of prior art two-to-three phase converters.
Figure 2B:
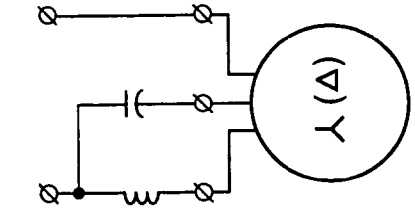
Figure 2C:
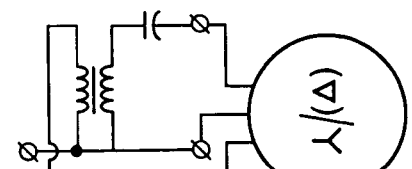
Figure 2D:
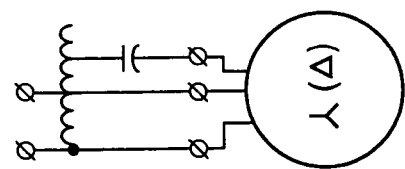
Figure 2E:
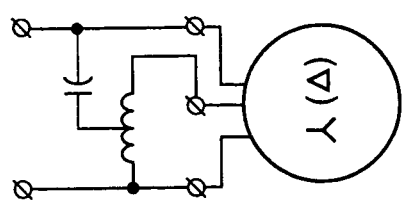
Figure 2F:
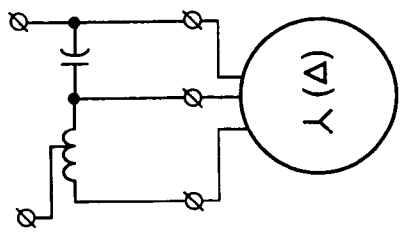
Figure 2G:
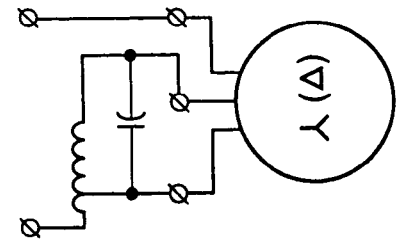
Figure 2H:
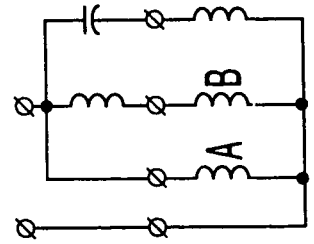
Figure 2I:
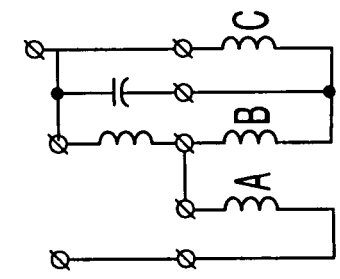
Figure 2J:
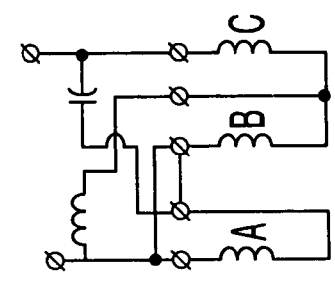
Figure 2K:
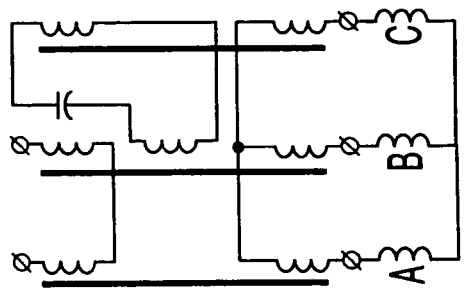
Figure 2N:
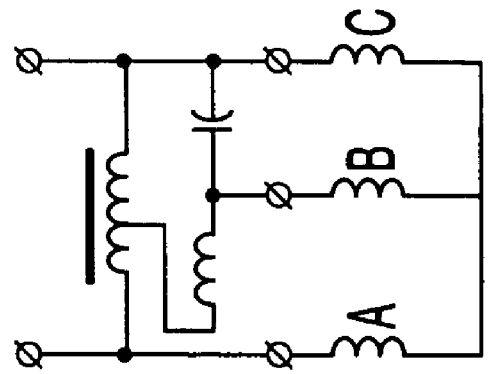
Figure 2M:
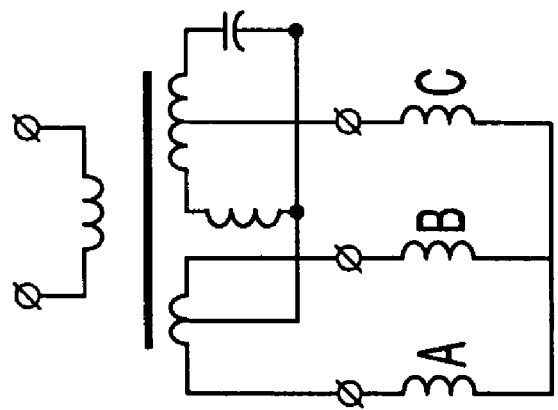
Figure 2L:
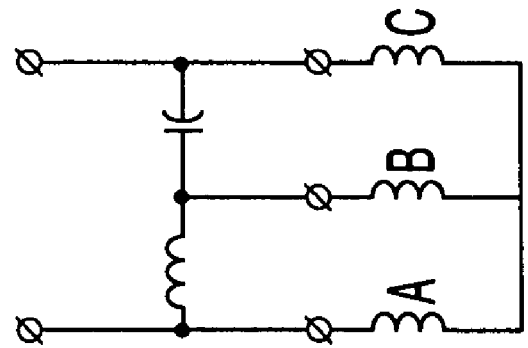
Figure 2:
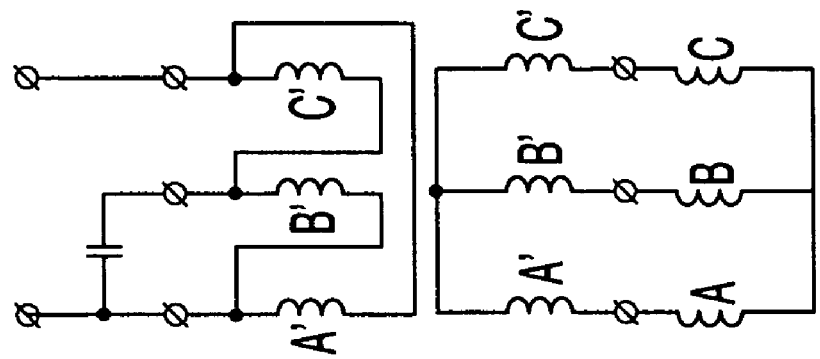
Figure 2:
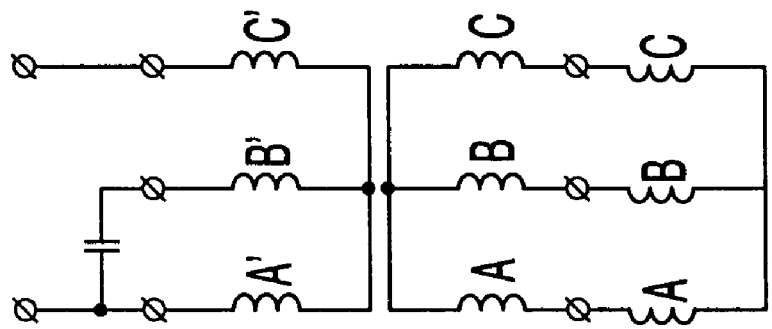
Figure 2:
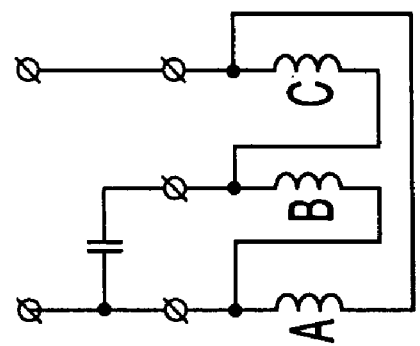
Figure 2:
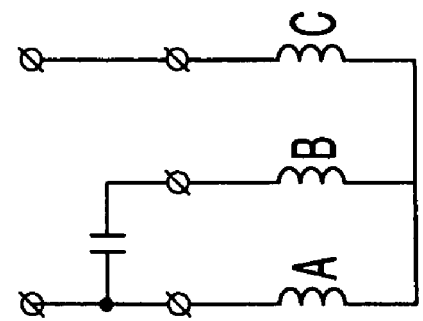
Figure 3:
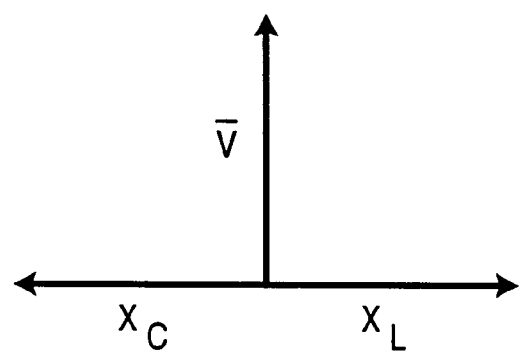
FIG. 3 is a vector diagram showing the phase relationship between inductive and capacitive reactance to the applied voltage.
Figure 4:
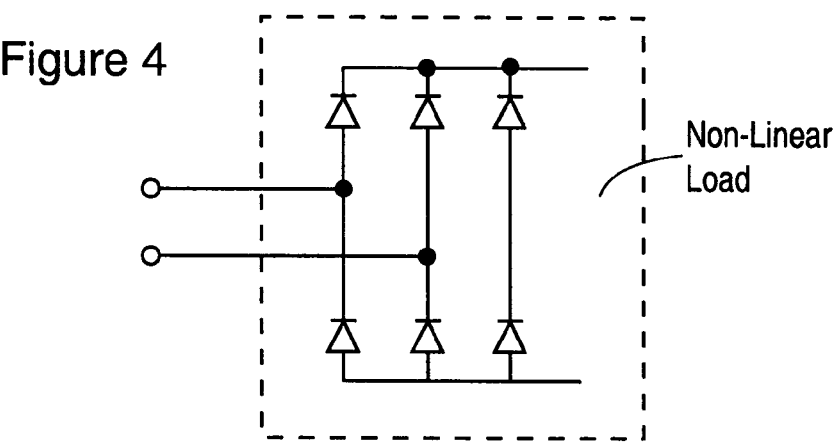
FIG. 4 is a schematic illustration of a prior art three-phase rectification bridge connected to a single-phase power supply system.
Figure 5:
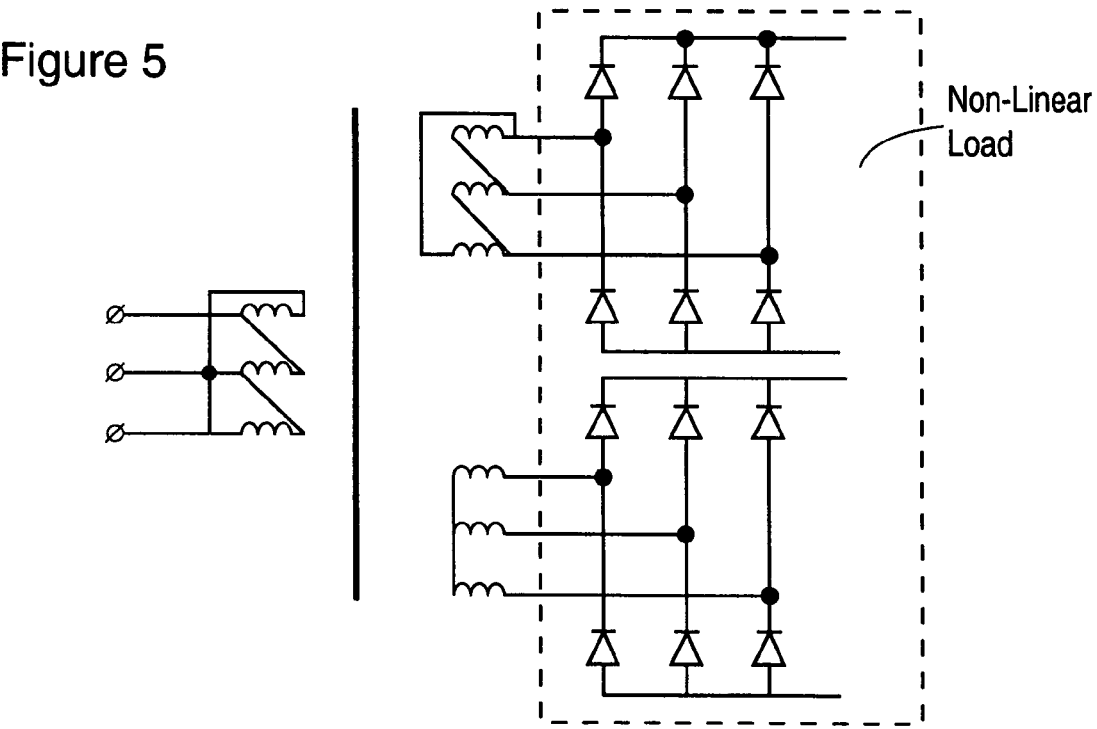
FIG. 5 is a schematic illustration of a three-phase power distribution system utilizing a typical prior art embodiment of a 12-pulse system.

At the same time, because the capacitive reactance $X_C$ provided by capacitors 24a, 24b, 24c leads the line voltage by 90° while the inductive reactance $X_L$ lags behind the line voltage by 90°, the voltage through each phase shifted output 30a, 30b, 30c is phase shifted relative to the voltage through the line. This has the effect of phase shifting the phase 4a, 4b or 4c of the second bridge rectifier 8'' relative to the phase 4a, 4b or 4c of the first bridge rectifier 8'. The characteristics of the crosslink winding 22 and capacitor 24 in each crosslink circuit 20 may be selected to provide a desired phase shift angle that will cancel the most problematic harmonics, which in the majority of cases will be phase shift of approximately 30° to eliminate $5^{th}$ and $7^{th}$ harmonic currents which are present at the highest levels (as shown in FIG. 1), but any desired phase shift can be achieved by selecting the characteristics of the crosslink winding 22 and capacitor 24 in each crosslink circuit 20 accordingly.

Figure 6A:
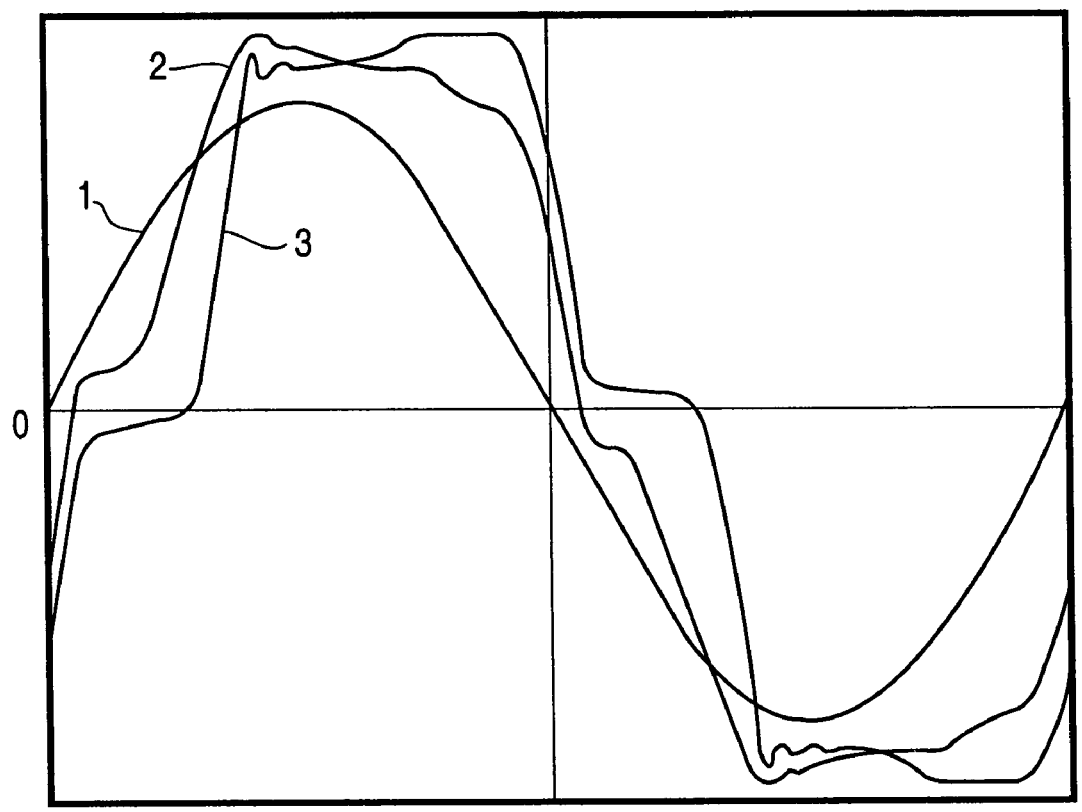
FIG. 6A is a graph showing a typical output voltage waveform of the device of FIG. 11.

FIG. 6A illustrates a typical output voltage waveform of the device of FIG. 6. It can be seen that the voltage ripple in the output voltage is considerably reduced.

Figure 7:
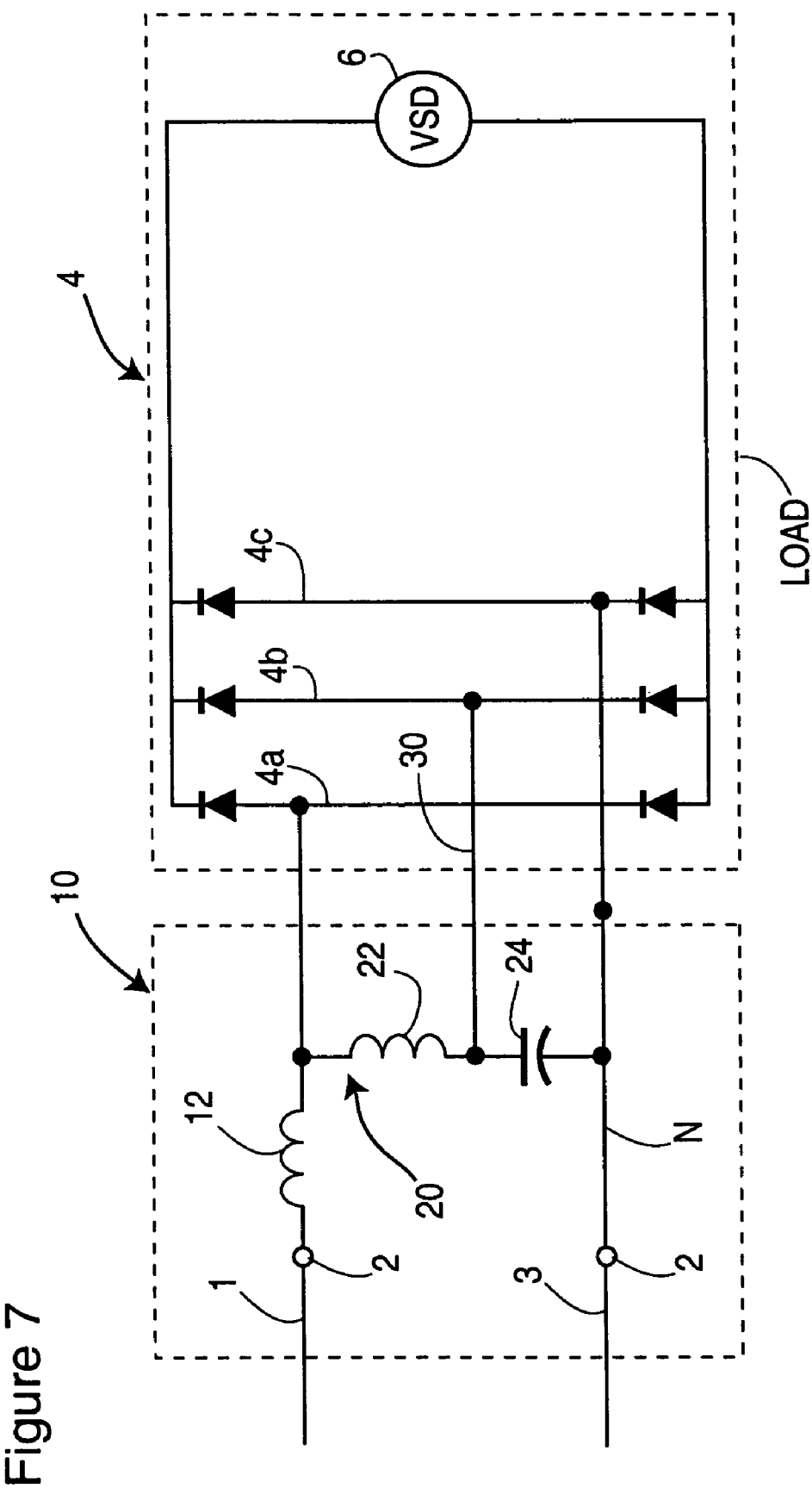
FIG. 7 is a schematic illustration of a single-phase power distribution system utilizing a single-phase embodiment of the invention for creation of a pseudo three-phase system.
Figure 8:
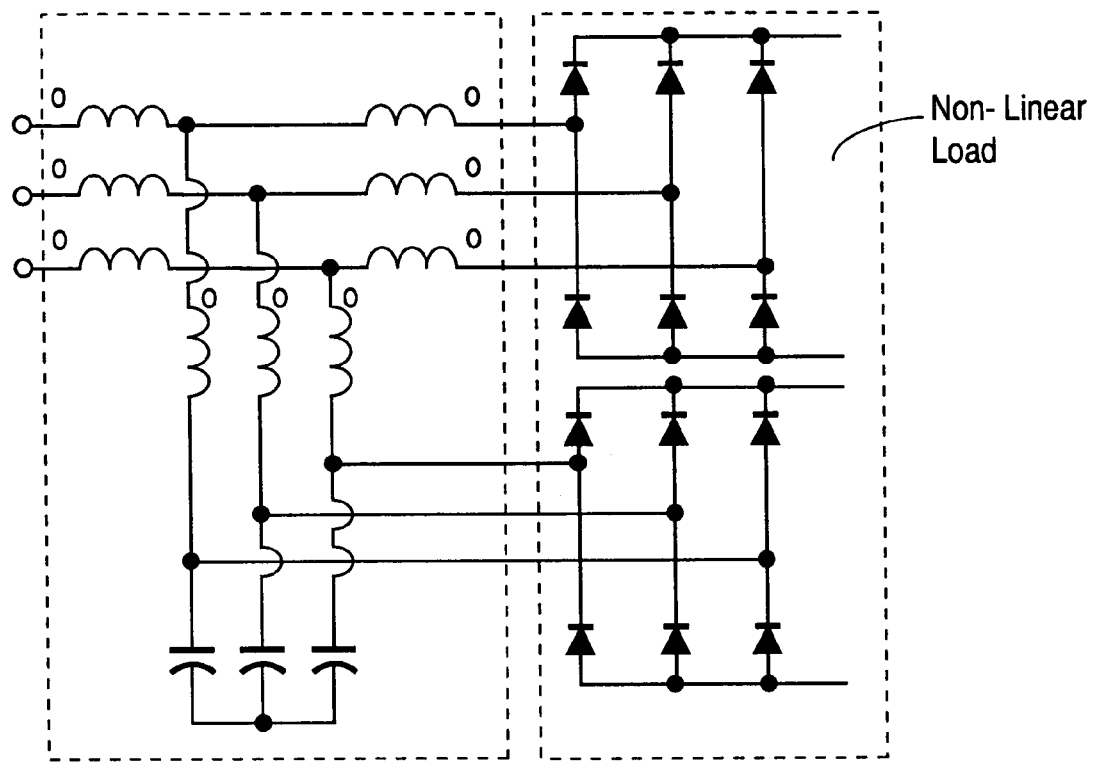
FIG. 8 is a schematic illustration of a three-phase power distribution system utilizing a three-phase embodiment of the invention in a 12-pulse system with one voltage drop compensating winding.
Figure 9:
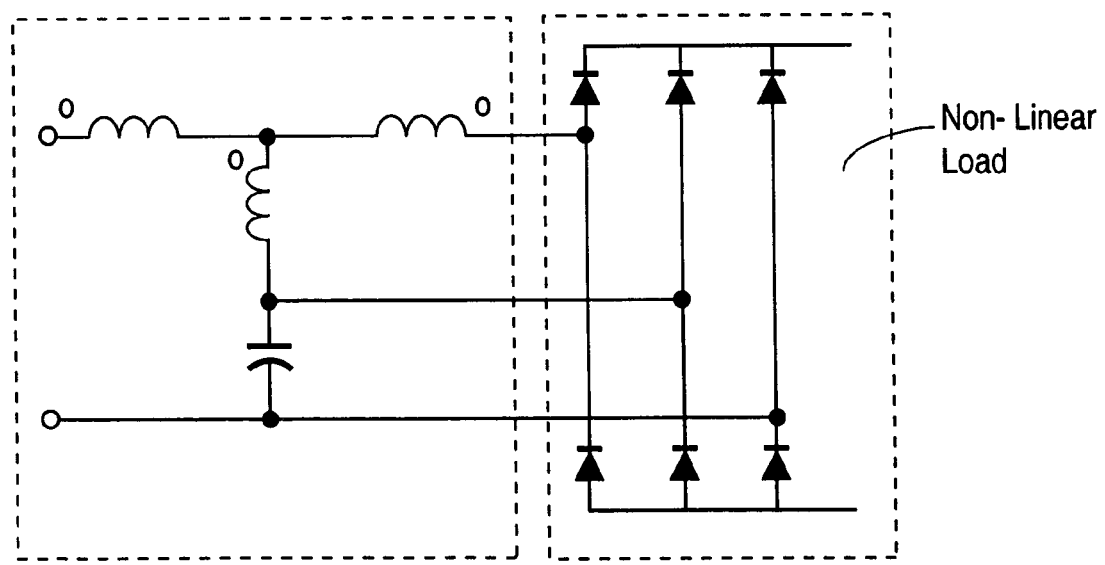
FIG. 9 is a schematic illustration of a single-phase power distribution system utilizing a single-phase embodiment of the invention in a pseudo three-phase system with one voltage drop compensating winding.
Figure 10:
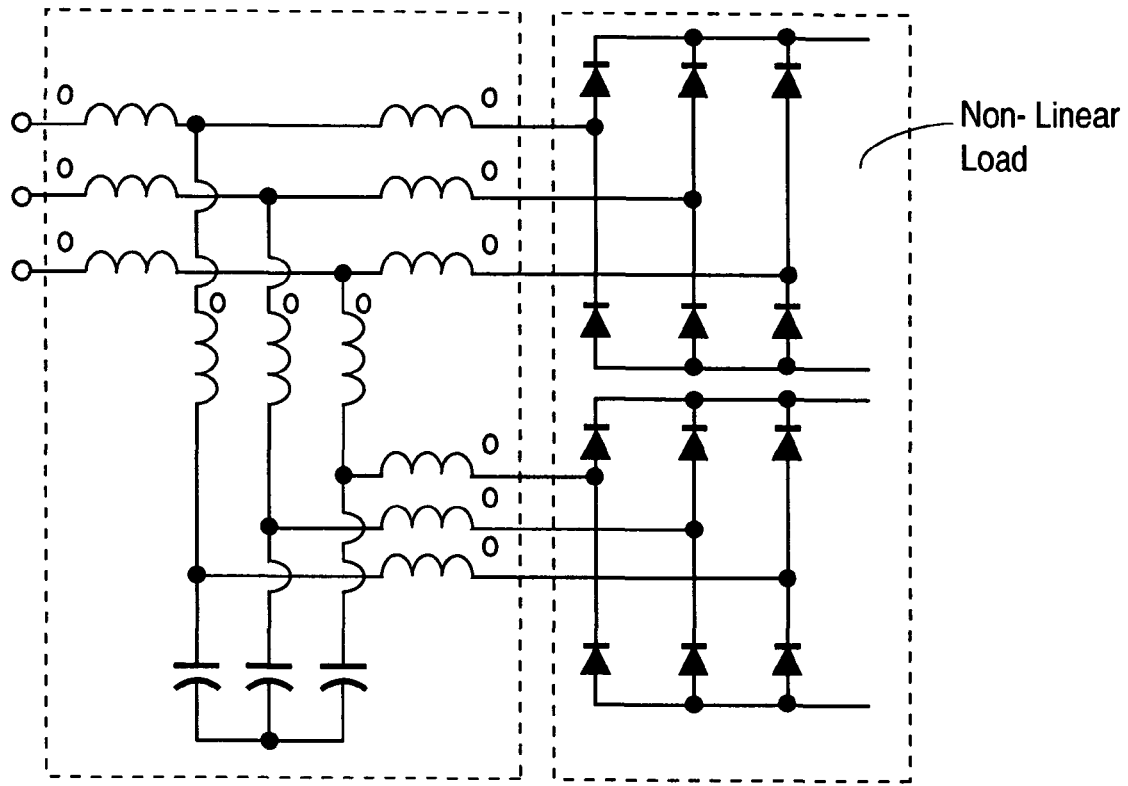
FIG. 10 is a schematic illustration of a three-phase power distribution system utilizing a three-phase embodiment of the invention in a 12-pulse system with two voltage drop compensating windings.
Figure 11:
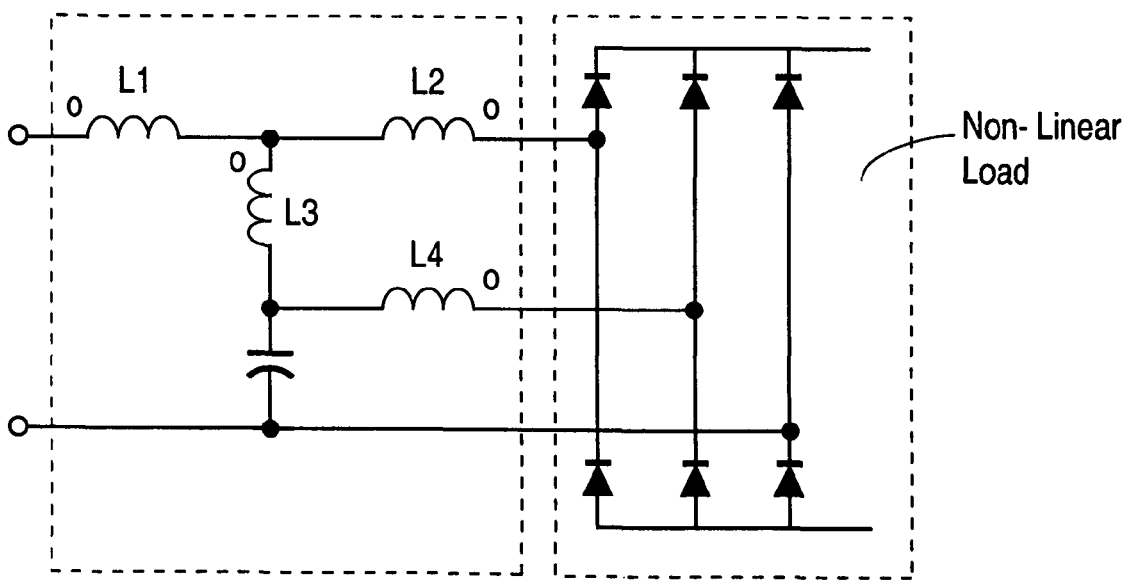
FIG. 11 is a schematic illustration of a single-phase power distribution system utilizing a single-phase embodiment of the invention in a pseudo three-phase system with two voltage drop compensating windings.
Figure 12:
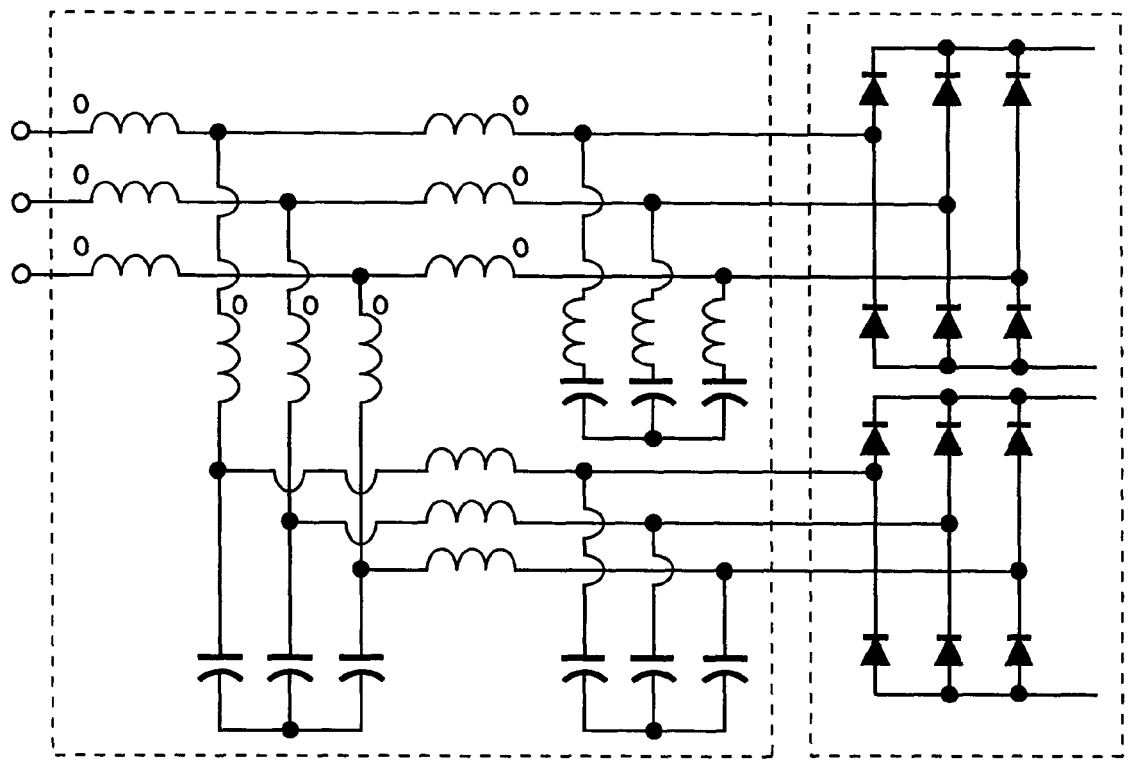
FIG. 12 is a schematic illustration of a three-phase power distribution system utilizing a three-phase embodiment of the invention a 12 pulse system with two voltage drop compensating windings and two output capacitors.
Figure 13:
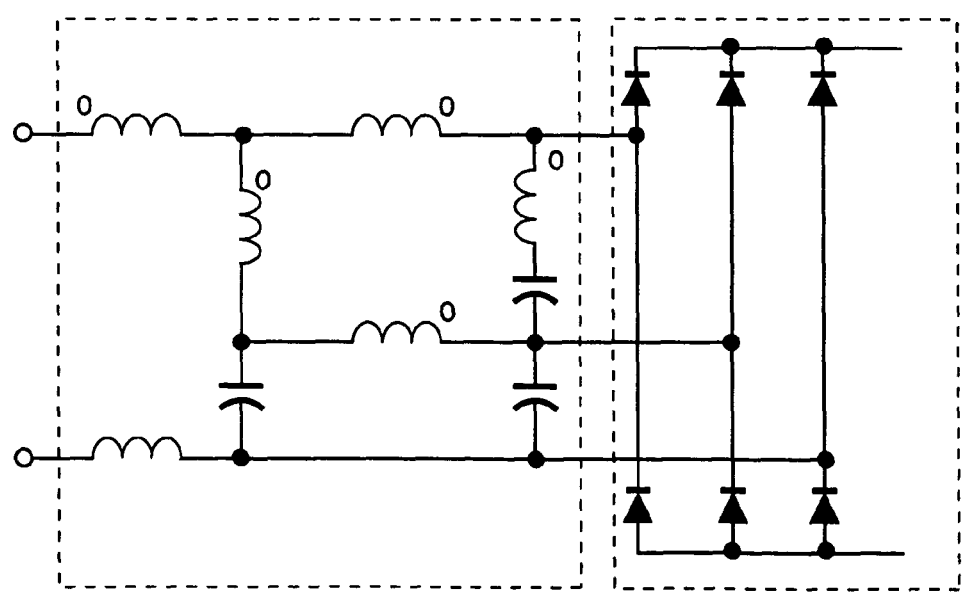
FIG. 13 is a schematic illustration of a single-phase power distribution system utilizing a single-phase embodiment of the invention to create a pseudo three phase system with two voltage drop compensating windings, a split line winding and output capacitors.
Figure 14A:
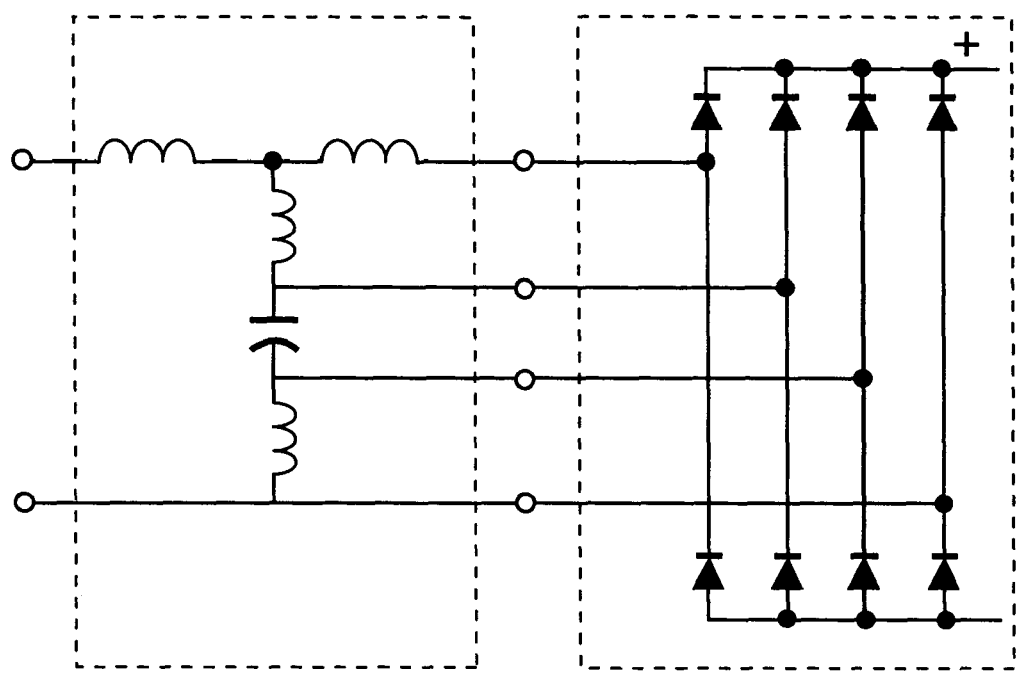
FIGS. 14A and 14B are schematic illustration of a single-phase power distribution system utilizing single-phase embodiments of the invention with one auxiliary winding and feeding a multi-phase rectifier bridge.
Figure 14B:
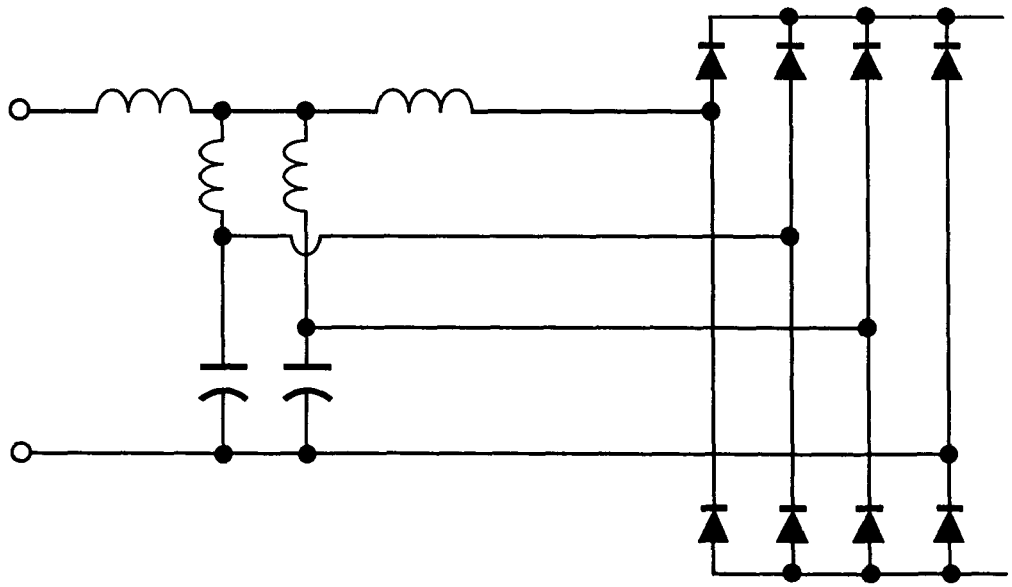
Figure 15A:
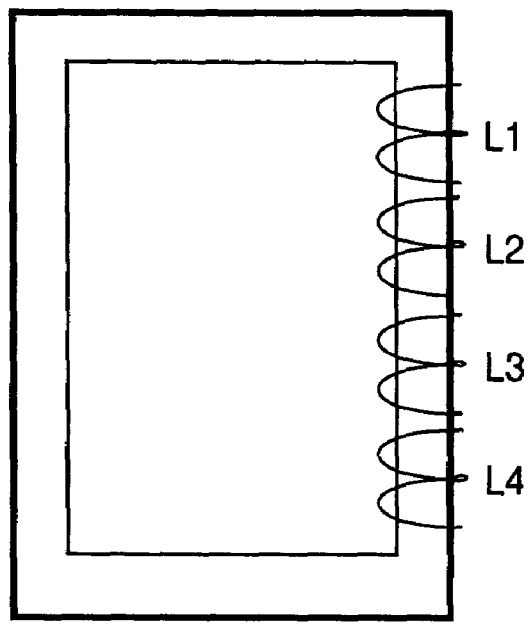
FIGS. 15A and 15B are schematic illustrations of a single-phase embodiment of the invention with windings located on one core leg and other windings split between two core legs.
Figure 15B:
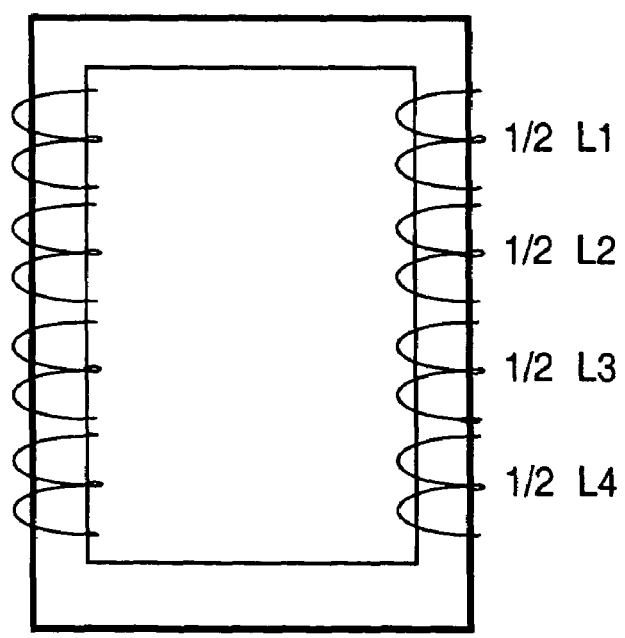

In a single-phase embodiment of the invention for supplying power to a three-phase load 4, illustrated in FIG. 7, the line winding 12 comprises a first end connected to the first line 1, from the power distribution system, and a second end connected to one phase 4a of the load 4. The line winding 12 interposes an impedance between the line 1 and the phase 4a of the load 4. A crosslink circuit 20 comprises crosslink winding 22 having a first end connected to the second end of the line winding 12, and a second end connected to a second line 3, which may for example be a neutral N as shown, or may be another phase of the power system, through a capacitor 24. The phase shifted output 30 is connected between the second end of the crosslink winding 22 and a different phase 4a, 4b or 4c of the load 4, in the example shown phase 4c of the load 4.

In this embodiment, by appropriate selection of the crosslink winding 22 and capacitor 24 the phase shifted output 30 can be phase shifted from both the first line 1 and the second line 3 (neutral N or another phase), to thus produce a quasi-third 'phase' even though the power distribution system only has two real phases. This creates a pseudo three-phase power supply for the three-phase load 4, which results in a significantly reduced level of DC bus voltage ripple, lower harmonic content in the input current, and a reduced level of current flowing through each diode in the bridge 4 (since the current is now distributed amongst three phases instead of two).

Thus, harmonic diversion through the crosslink circuit 20 is achieved by selecting the elements of the crosslink circuit 20 to have a lower (combined) impedance than the line winding 12, for targeted harmonics, while phase shifting to the desired angle for harmonic cancellation is achieved by selection of the characteristics of the crosslink winding 22 relative to the crosslink capacitor 24, providing a leading or lagging phase shift which creates a pseudo third "phase" that is phase shifted relative to both the first line (power supply line 1) and the second line 3 (neutral N in the embodiment shown). The appropriate selection of the crosslink component parameters can be determined by computer modelling or through experimentation.

Generally stated, in the preferred embodiment the method of phase conversion and harmonic mitigation according to the single phase embodiment of the invention thus comprises the steps of:

a. supplying power from a first phase of the power distribution system to an input of the load 4, through at least one line winding 12, respectively;

b. diverting power through a crosslink circuit 20 comprising at least one crosslink winding 22 having a first end connected to a load end of the line winding 12 and a second end connected through a capacitor 24, to a second line, for example another crosslink circuit 20, another phase or a neutral (not shown), and c. supplying power from the crosslink circuit 20 to another input of the load 4 through a phase shifted output 30 between the second end of the crosslink winding 22 and the second phase of the load 4, to thereby phase shift the second phase of the load 4 relative to the first phase.

FIGS. 8 to 15 illustrate further embodiments of the invention, with reference numerals indicating components corresponding to those in the embodiments of FIGS. 6 and 7.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A combined phase converter and harmonic mitigating device for connection between a power distribution system and a multi-phase load, comprising at least one line winding, having a first end connected to a first line comprising a first phase of the power distribution system and a second end connected directly or indirectly to a first input of the load, a crosslink circuit comprising at least one crosslink winding, having a first end connected to the second end of the line winding and a second end connected through a capacitor to a second line, and a phase shifted output between the second end of the crosslink winding and a second input of the load, whereby the voltage through the phase shifted output is phase shifted relative to the voltage through the first line.

2. The combined phase converter and harmonic mitigating device of claim 1 wherein the second line comprises another crosslink circuit.

3. The combined phase converter and harmonic mitigating device of claim 1 wherein the second line comprises a neutral.

4. The combined phase converter and harmonic mitigating device of claim 1 wherein the second end of the line winding is connected indirectly to the first input of the load through at least one auxiliary winding.

5. The combined phase converter and harmonic mitigating device of claim 4 wherein the auxiliary winding is connected in a polarity corresponding to a polarity of the line winding.

6. The combined phase converter and harmonic mitigating device of claim 4 wherein the auxiliary winding is connected in a polarity opposite to a polarity of the line winding.

7. The combined phase converter and harmonic mitigating device of claim 1 wherein the phase shifted output comprises a winding.

8. The combined phase converter and harmonic mitigating device of claim 1 for a three-phase power distribution system wherein a line winding, crosslink circuit and phase shifted output is provided for each phase.

9. A harmonic mitigating device for connection between a three-phase power distribution system and a three-phase load, comprising, for each phase,
   at least one line winding, having a first end connected to a first line comprising a phase of the power distribution system and a second end connected directly or indirectly to a first input of the load,
   a crosslink circuit comprising at least one crosslink winding, having a first end connected to the second end of the line winding and a second end connected through a capacitor to a second line, and
   a phase shifted output between the second end of the crosslink winding and a second input of the load,
   whereby the voltage through the phase shifted output is phase shifted relative to the voltage through the first line.

10. The harmonic mitigating device of claim 9 wherein the second line comprises another crosslink circuit.

11. The harmonic mitigating device of claim 9 wherein the second line comprises a neutral.

12. The harmonic mitigating device of claim 9 wherein the second line comprises a phase of the power distribution system.

13. The harmonic mitigating device of claim 9 wherein the second end of the line winding is connected indirectly to the first input of the load through at least one auxiliary winding.

14. The harmonic mitigating device of claim 13 wherein the auxiliary winding is connected in a polarity corresponding to a polarity of the line winding.

15. The harmonic mitigating device of claim 13 wherein the auxiliary winding is connected in a polarity opposite to a polarity of the line winding.

16. The harmonic mitigating device of claim 9 wherein each phase shifted output comprises a winding.

17. A method of phase conversion and harmonic mitigation in a power distribution system supplying electrical power to a multi-phase load, comprising the steps of:
   a. supplying power from a first line comprising a first phase of the power distribution system to a first input of the load, directly or indirectly through at least one line winding,
   b. diverting power, through a crosslink circuit comprising at least one crosslink winding having a first end connected to a load end of the line winding and a second end connected through a capacitor, to a second line, and
   c. supplying power from the crosslink circuit to a second input of the load through a phase shifted output between the second end of the crosslink winding and the second phase of the load, to thereby phase shift the second phase of the load relative to the first phase of the load.

18. The method of claim 17 wherein the second line in step b. comprises another crosslink circuit.

19. The method of claim 17 wherein the second line in step b. comprises a neutral.

20. The method of claim 17 wherein the second line in step b. comprises another phase of the power distribution system.

21. The method of claim 17 wherein in step a the power is supplied indirectly to the first input of the load through at least one auxiliary winding connected in series between the line winding and the load input.

22. The method of claim 21 wherein the auxiliary winding is connected in a polarity corresponding to a polarity of the line winding.

23. The method of claim 21 wherein the auxiliary winding is connected in a polarity opposite to a polarity of the line winding.

24. The method of claim 17 wherein in step c. power is supplied from the crosslink circuit to the second input of the load through a winding.

25. The method of claim 17 for use in a three-phase power distribution system, wherein steps a. to c. are performed for each phase.

* * * * *